July 23, 1963 R. HASTINGS, JR 3,098,543
MULTI-PURPOSE CONTROL MEANS FOR INDUSTRIAL TRUCKS AND THE LIKE
Original Filed June 8, 1959 3 Sheets-Sheet 1

INVENTOR
RUSSELL HASTINGS JR.
BY J.C. Wiessler
ATTORNEY

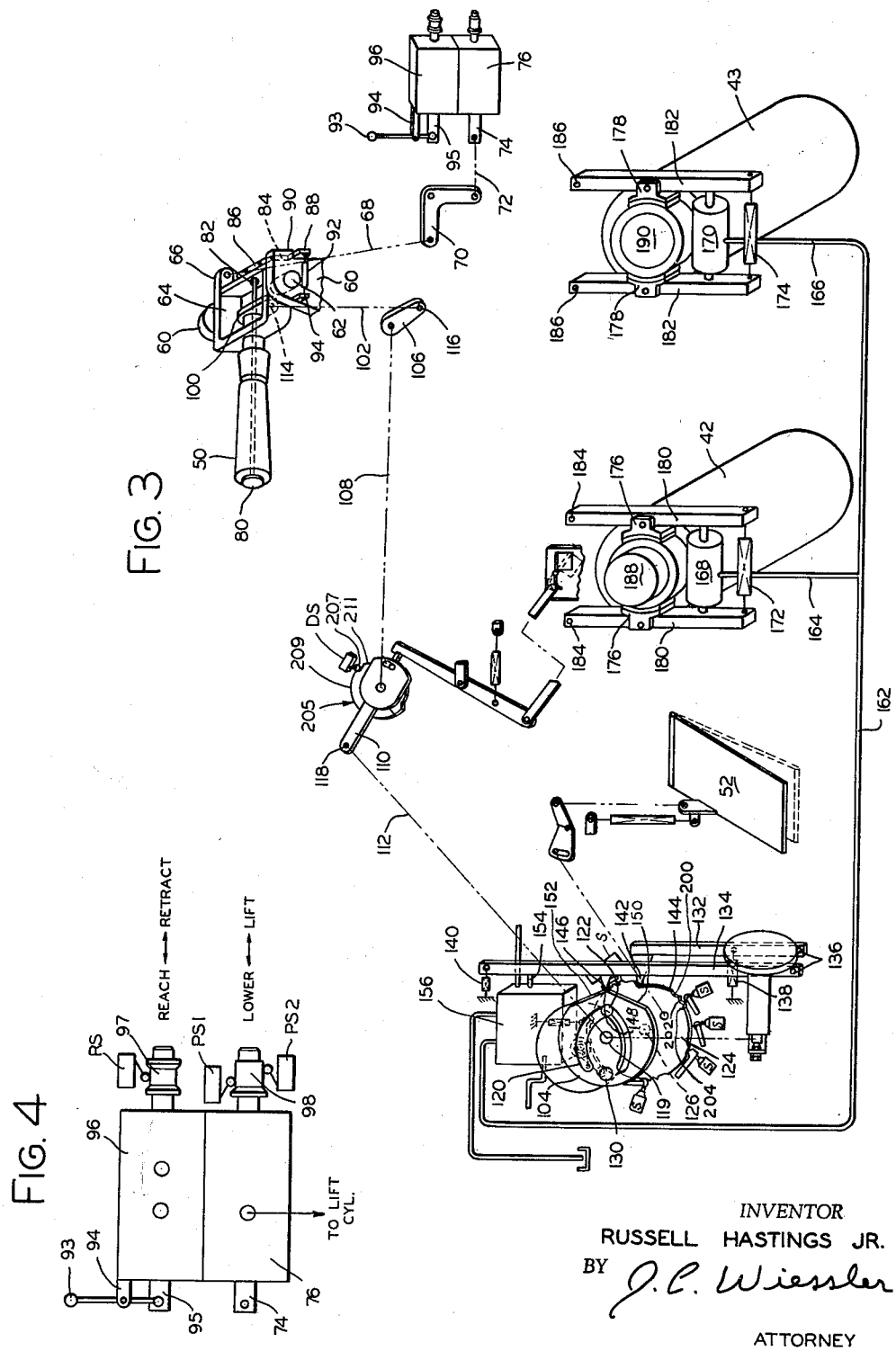

INVENTOR
RUSSELL HASTINGS JR.
BY
J.C. Wiessler
ATTORNEY

United States Patent Office 3,098,543
Patented July 23, 1963

3,098,543
MULTI-PURPOSE CONTROL MEANS FOR
INDUSTRIAL TRUCKS AND THE LIKE
Russell Hastings, Jr., Battle Creek, Mich., assignor to
Clark Equipment Company, a corporation of Michigan
Original application June 8, 1959, Ser. No. 818,869. Divided and this application Dec. 22, 1961, Ser. No. 161,592
10 Claims. (Cl. 187—9)

This application is a division of the copending original application of Russell Hastings, Jr., for "Industrial Truck," filed June 8, 1959, Serial No. 818,869.

This invention relates to industrial trucks and more particularly to industrial lift trucks of a type generally known as "reach" or "narrow-aisle" lift trucks which are capable of performing all necessary material handling operations in warehouse access aisles, for example, of relatively narrow width, thereby enabling more profitable use of storage floor area.

In my copending U.S. application Serial No. 818,678, filed June 8, 1959, now Patent No. 3,057,426, there is disclosed a novel traction wheel and motor construction in trucks of the type contemplated which utilizes two laterally spaced drive wheels at the rear of the truck and a separate non-rotatable traction motor associated with each such wheel, such motors being constructed to rotate in opposite directions in operation which essentially eliminates undesirable motor torque reaction in that one motor offsets the opposite torque reaction of the other. In this manner, turning force which would otherwise have to be restrained by the operator exerting an opposed force through the steering wheel is eliminated.

The present invention is primarily concerned with a vastly improved control system for such dual traction units, and, therefore, details of the traction units per se are not disclosed herein, reference being made to the aforementioned copending application.

A universal problem heretofore experienced in the operation of standup drive reach trucks relates to inconvenience to the operator in that such trucks have been inherently awkward and tiring to operate. Until the present invention the only means devised for applying the brakes while utilizing the same as parking brakes required the operator to balance on one foot while elevating the other foot from the brake pedal located in the floor portion of the operator's station. Such trucks have normally applied spring actuated brakes which are released by depressing the brake pedal. It is not only fatiguing to be required to balance on one foot while keeping the other foot raised from the pedal, but it has also been found to be tiring to continue to hold the pedal down through a considerable part of the day inasmuch as the operator is unable to momentarily shift his weight from one foot to the other during movement of the truck. The seriousness of this problem may be more fully appreciated when it is realized that during a normal day's operation such a truck may be required to stop and start several hundreds of times.

It has been customary in conventional sit-down counterbalanced lift trucks for the operator to utilize both his hands and his feet simultaneously to operate the controls. In a stand-up lift truck, however, it has been found that the operator's feet should be utilized only for standing purposes and not for control purposes, as explained above. The operator's left hand is normally more or less continuously employed in steering the truck, whereby only one hand remains which is free to operate all other controls of the truck. Also, it is customary for a skillful driver to lift or lower the fork tines, while at the same time controlling the forward or reverse motion of the truck. In order that such stand-up trucks be as versatile as sit-down trucks, I have provided a master controller at the operator station which is controlled in all of its functions by means of a single operator control member. My invention provides a master control member by means of which the driver can, in the use of one hand only, control the direction of movement of the truck, control the brakes of the truck, select any one of a plurality of operational speeds in both forward and reverse, and control simultaneously, if desired, lifting or lowering of the fork tines, while, at the same time, provide a supporting member for steadying the operator which in no way interferes with operation of the truck.

It has been found that accelerating and braking forces often cause the driver to lurch forward or backward in stand-up type trucks. In prior constructions the operator has had no available means by which to steady himself. Inasmuch as the vehicle of the present invention provides higher speeds of travel than heretofore available in such trucks, the above problem tends to be accentuated. The present invention provides a control member construction which is capable not only of controlling the various above-mentioned functions, but in addition provides an operator stabilizing means.

It is therefore an important object of the invention to provide an operator master control member which is capable of performing a multitude of control functions while, at the same time, providing support for the operator.

It is another object of the invention to generally improve the structure of vehicular multi-function operator control means.

Other important objects, features and advantages of the present invention will appear in the detailed description which follows when taken in conjunction with the accompanying drawings, wherein.

Figure 6:
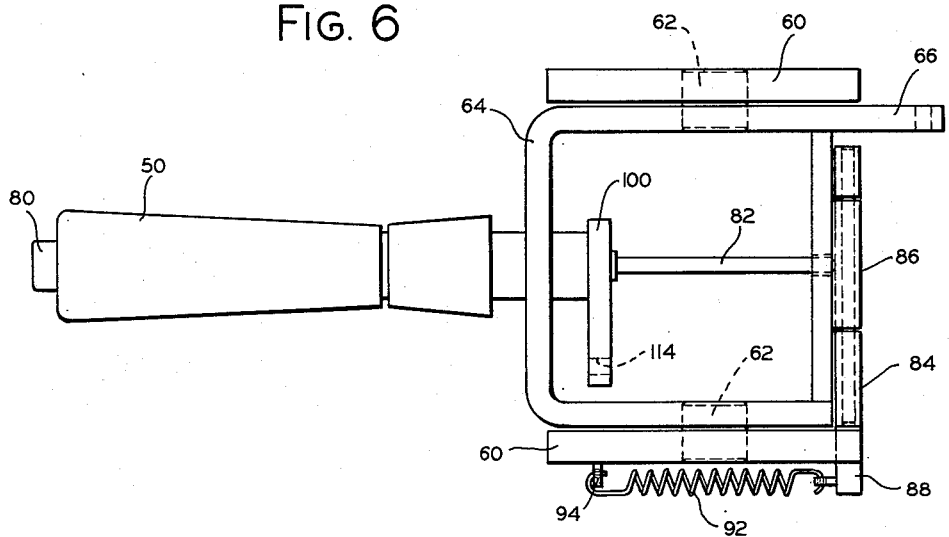
Figure 5:
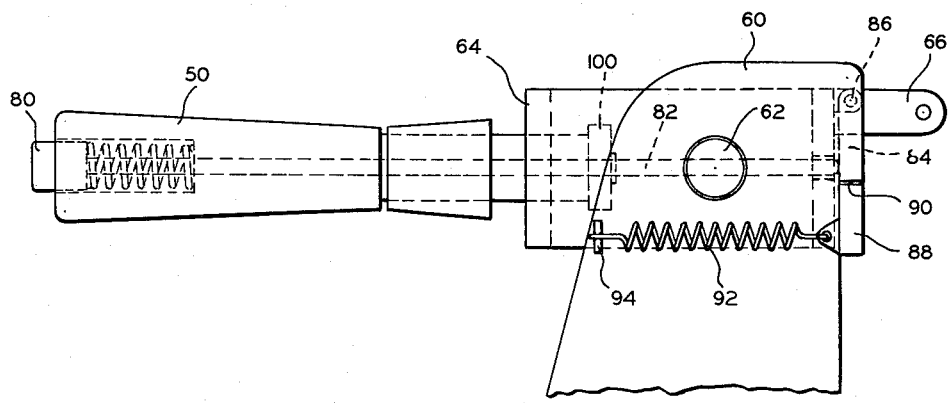

FIGURE 3 is a schematized perspective view of various of the control elements which form a part of the present invention; and FIGURE 4 is an enlarged schematic view illustrating in greater detail a portion of the control system of FIGURE 3; and FIGURE 5 is an enlarged elevation view showing the control handle portion of FIGURE 3; and FIGURE 6 is an enlarged plan view showing the control handle portion of FIGURE 3.

Figure 2:
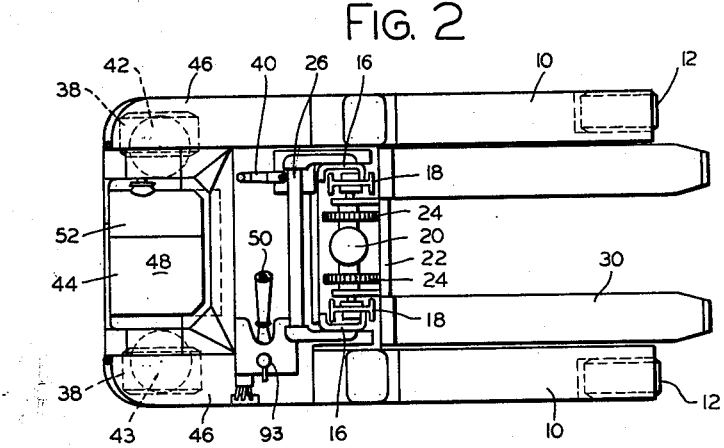
FIGURE 2 is a plan view of FIGURE 1.
Figure 1:
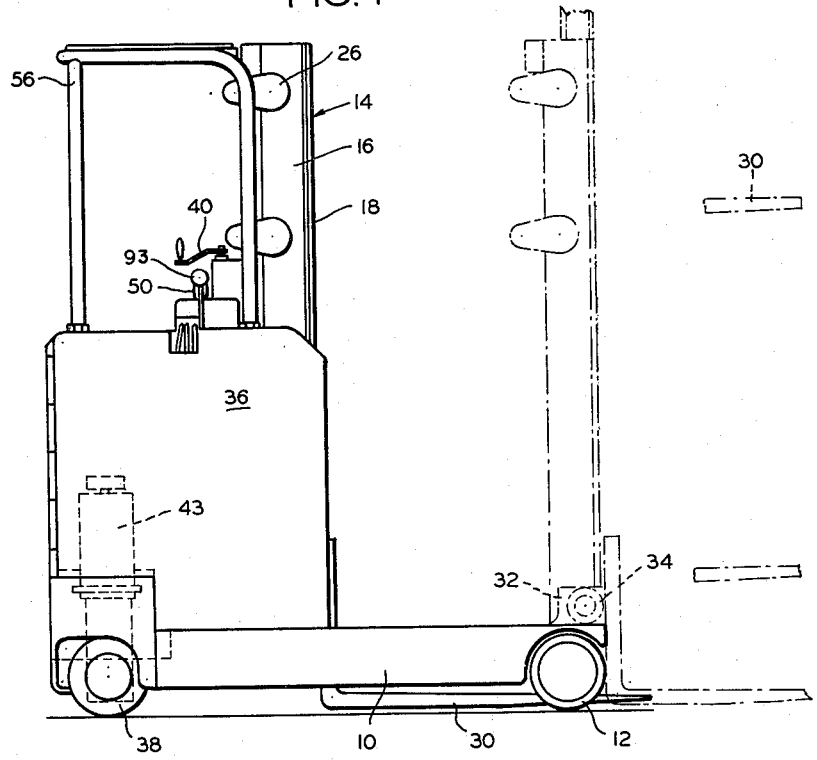
FIGURE 1 is a side elevational view showing the general arrangement of an industrial lift truck of a type which may utilize the features of the present invention to particular advantage.

Referring now in detail to the drawings, and first to FIGURES 1 and 2, the main frame of a wheeled truck is generally in the form of a U-shape, the projecting legs of which are transversely spaced apart. Each outrigger leg consists of a longitudinally extending channel construction 10 upon each of which is mounted a ground engaging wheel 12. The opposite ends of the legs are secured together and the space therebetween is bridged by means of transverse frame members. A lifting mast mechanism of known construction is illustrated at numeral 14 and comprises generally a pair of laterally spaced outer fixed channel members 16, a pair of laterally spaced I-beams 18 suitably nested within the channel members for vertical telescoping movement, a hydraulic cylinder lifting motor 20, and a lifting carriage 22 mounted in known manner for vertical movement relative to members 18 and connected to hoist motor 20 by means of a pair of chain and sprocket mechanisms 24. Transverse brace means 26 tie together channel members 16 for rigidifying the mast structure. A pair of fork tines 30 are supported upon carriage 22.

The mast structure 14 is suitably connected by means of a pair of rearwardly extending L-shaped brackets 32, only a portion of one of which is illustrated, to the channel members 10 for longitudinal movement relative thereto. Each member 32 is secured to a lower side portion of one of channel members 16 and mounts the upright upon the channel members by means of a pair of rollers located adjacent the opposite ends of each L-shaped bracket and in rolling abutment with inner and outer surfaces of the upper flange member of each channel construction 10. An upper one of such pairs of rollers is illustrated at numeral 34. The bracket members 32 are associated with a worm gear mechanism, not shown, located within each channel member 10 so that as the worm gears are rotated in one or the other directions the mast 14 is actuated longitudinally outwardly or inwardly of the legs, as illustrated in FIGURE 1. Suitable motor means and driving mechanism, not shown, are mounted within a housing construction 36 for driving the worm gear mechanisms, and thereby the mast construction 14 is disclosed and claimed in copending continuing U.S. application Serial No. 111,070, filed May 18, 1961, in the names of Hastings and Backofen (common assignee).

Suitably mounted within the framework of the truck and housed within the rear corner portions of body 36 is a pair of dirigible wheels 38 having power steering control mechanism associated therewith, controllable by means of a steering tiller 40. The linkage connection between tiller 40 and the traction wheels is described in detail in my aforementioned copending application Serial No. 818,678, now Patent No. 3,057,426. The dirigible wheels comprise also traction wheels and are associated with electric motors 42 and 43. Motors 42 and 43 as before explained, are constructed for opposite rotation, one relative to the other, whereby to neutralize reaction torque which would otherwise be required to be compensated for at steering tiller 40, or in some other manner. As pointed out above, the driving-steering-motor combination is disclosed and claimed in my copending application Serial No. 818,678.

A generally U-shaped operator's station 44 is located at the after end of the truck and is formed between rearwardly extending leg portions 46 of control and body housing 36. The operator's platform 44 comprises a fixed portion 48 and a pivoted parking brake portion 52. Located on the right hand side of the truck atop body portion 36 is a main operator's control handle 50, which will be described in detail hereinafter.

An overhead guard construction 56 is illustrated in FIGURE 1. It is mounted upon housing 36 and is adapted to protect the driver from injury which might otherwise result if an object were to fail from an elevated position above the operator's compartment.

The construction of the narrow-aisle truck has been described with reference to FIGURES 1 and 2 only in general terms, inasmuch as such construction per se does not comprise a part of the present invention except as may appear hereinafter relative to a more detailed description of the construction.

*Operator's Control*

Referring now especially to FIGURE 3, the single operator's control handle 50 is adapted to control all functions of truck operation, as explained generally above, excepting steering of the truck, which is controlled by means of tiller 40, control of upright 14 in extension and retraction, which is effected by means of a switch in conjunction with electrical circuitry and power means therefor, and control of the parking brake, which is actuated by pedal 52 and associated with the master controller, but which is not controlled by handle 50. A pair of laterally spaced and upwardly extending mounting members 60 are supported upon the upper right portion of body housing 36, in each of which there is mounted a trunnion pin 62 which extends inwardly thereof for mounting thereon a vertically pivoted yoke 64. Control handle 50 is mounted upon the one end of yoke 64, which yoke includes at one side thereof an ear 66 having a pivoted link 68 extending downwardly therefrom to a pivotal connection with a bell crank 70 which is pivoted at its opposite end to a connecting link 72 of a valve plunger 74. A lifting and lowering valve means 76 is adapted to control the operation of hoist cylinder motor 20. For present purposes it may be noted that inward movement of plunger 74 serves to first actuate a first pump switch and to open the valve 76 for energizing hoist motor 20 to lift fork tines 30. The initial movement of the valve plunger starts a first pump motor for slow speed lifting action. Further inward movement of the plunger to its travel limit then actuates another pump switch for high speed lifting action. Lowering movement of the forks is controlled by outward motion of plunger 74. An upward clockwise movement of handle 50 effects, through yoke 64 and linkage 68, 70 and 72, an inward motion of plunger 74 for controlling lifting action, whereas a downward counter-clockwise movement of control handle 50 has an opposite effect.

A situation wherein the operator might lurch forward and accidentally push downwardly on the control handle without intending that the forks be lowered is avoided in the utilization of a safety interlock button 80 which extends axially inwardly beyond handle 50 within yoke 64 and through an opening 82 in the yoke. A latching member 84 is pivoted on a hinge 86 at the one side of the yoke and includes a projection 88 which extends beneath an overhanging ledge 90 of the one supporting member 60. A spring 92 is connected to movable projection 88 and to a fixed projection 94 of support member 60 for normally holding latch 88 beneath ledge 90. This arrangement prevents control handle 50 from being actuated downwardly to induce lowering movement of the forks unless interlock button 80 is first depressed. Depression of the button causes latch 84 to pivot outwardly about hinge 86 out of interfering relation to ledge 90, whereby to permit the control handle to be actuated as aforesaid in order to control lowering of the forks.

The control handle may also be rotated in either direction about its own axis, which motivates a master controller to actuate control circuitry of traction motors 42 and 43 such that both the direction of travel of the vehicle, the speed of the vehicle, controlled braking of the vehicle, and various other interlocking and associated controller mechanism and circuitry is or may be motivated.

Before proceeding with a more detailed description of the master controller and associated circuitry it is important to note that control handle 50 is mounted on the truck body so that it extends substantially transversely of the body of the operator when the operator is facing forwardly of the truck. Although, in association with the various control mechanisms, all of the foregoing operating functions are capable of being fully controlled merely by actuating the handle either upwardly or downwardly in a vertical plane or by rotating it about its own axis, the handle means 50 provides yet an additional function. It will be noted that the handle is rigidly mounted in a horizontal plane which lies transverse of the operator so that it provides a convenient means for steadying the operator during operation of the truck. The construction is such that the operator cannot push or pull the control handle forwardly or rearwardly of the truck. In other words, without danger of unintentionally effecting actuation of any truck control means, the operator is able to steady himself by means of the main control handle. Since one hand of the operator will be almost continuously located on the control handle during operation of the truck, it is most beneficial to his safety and convenience to incorporate the stabilizing means in the control handle construction.

A second control handle 93 is pivotably supported on an arm 94 and is adapted to actuate a valve plunger 95 for controlling a mast reach valving means 96 to actuate the mast 14 in extension and retraction, said valving means being adapted to energize a pump motor by way of a valve plunger camming means 97 which is adapted to close a normally open switch RS. It will also be noted that a camming means 98 is actuated by valve plunger 74 to successively actuate a pair of pump switches PS1 and PS2, which effects successive low and high speed lifting of the fork, as pointed out above.

*Master Controller for Travel and Braking*

Turning now to some of the details of the travel and brake controls, control handle 50 is connected to a crank member 100 which extends within the yoke transversely of the handle member. The crank is pivotally connected at its other end to a vertical link 102 which is operatively connected to an upper control cam 104 of the master controller by means of a crank 106, a rotatable rod 108 which extends transversely of the truck within body 36, a vertically extending crank 110, and a rearwardly extending link 112. In order to facilitate the foregoing arrangement of mechanical linkage, spherical type joints are utilized at locations 114, 116, 118 and 119. The linkage of FIGURE 3 has been schematically represented in order to facilitate understanding. References to the directions rearwardly, forwardly and vertically relative to the linkage of FIGURE 3 pertain to the actual construction in relation to the truck.

The operator grasps the control handle 50 with his right hand. Rotation of the handle forwardly about its axis, i.e., in a counter-clockwise direction as viewed from the left end of the handle, causes the truck to move in a forward direction. Return of the handle to a neutral position effects application of the brakes. Rotation of the handle rearwardly about its axis, i.e., in a clockwise direction as viewed from the left end of the handle, effects reverse movement of the truck. This type of control is generally known as "directional control," which tends to make such controls instinctive on the part of the operator. The degree of such forward or rearward rotation of handle 50 determines the speed in forward or reverse, respectively, at which the truck will operate.

Upper cam 104 forms a generally U-shaped cam track 120 in which is closely fitted a cam follower 122. Follower 122 is mounted upon a lower cam 124 which is in turn supported by a vertical trunnion and bearing 126. Forward rotation of control handle 50 effects, through the above described linkage mechanism, a counter-clockwise rotation of upper cam 104 about a vertical shaft and bearing support 130, whereas reverse rotation of handle 50 effects a clockwise movement of cam 104 about shaft 130. The shape of camming track 120 is such that rotation of cam 104 acts upon follower 122 to cause the lower cam 124 to rotate in a counter-clockwise direction about trunnion 126 irrespective of whether the upper cam rotates clockwise or counter-clockwise from a neutral position.

A pair of vertically spaced cam follower arms 132 and 134 are pivotally mounted to the frame of the truck about a common center 136. Springs 138 and 140 urge arms 132 and 134, respectively, in a counter-clockwise direction about common center 136. A cam follower roller 142 is connected to arm 132 and abuts a cam surface 144 of lower cam 124, and cam follower roller 146 is connected to arm 134 and contacts a peak 148 formed between opposed slopes 150 and 152 of upper cam 104 when the master controller is in a neutral position, as shown. Cam follower arm 132 is a speed control arm and follower arm 134 is a brake control arm. Counter-clockwise rotation of lower cam 124 away from its neutral position causes cam follower 142 to always initially move up slope 144, while simultaneous movement of upper cam 104, either clockwise or counter-clockwise away from a neutral position, causes roller 146 on upper arm 134 to always initially move down one of the two slopes 150 or 152, thus permitting spring 140 to pull the one end of arm 134 in a counter-clockwise direction against a valve plunger 154 of a brake control valve assembly 156. As valve plunger 154 is moved inwardly of valve body 156 it causes means within valve body 156, disclosed in detail in my said copending application Serial No. 818,869, to modulate in a predetermined manner an increasing brake release pressure in conduits 162, 164 and 166, which actuates brake cylinders 168 and 170 against the forces of brake applying springs 172 and 174 of the pairs of brake shoes 176 and 178, respectively. The pairs of brake shoes are mounted upon pairs of brake levers 180 and 182 which are mounted for pivotal movement in opposite directions about fulcrums 184 and 186, respectively, whereby the brake shoes are urged by the brake springs into braking relation with brake drums 188 and 190 located on a pair of drive shafts of the pair of traction motors 42 and 43. Suffice it to say for present purposes that the hydraulic control portion of the brake system modulates brake release pressure in accordance with a predetermined schedule which it is the function of control cam 104 to provide. Gradual rotation of control handle 50 in either forward or reverse causes the brake relesae pressure to be modulated for a certain number of degrees of handle 50 rotation. An intermediate position of the control handle relative to the length of slope 150 or 152 holds the brakes continuously in a partially released position with the brake shoes 176 and 178 contacting the brake drums but with diminished force. This type of control is required, for example, when the truck descends a grade at a constant speed.

Rotation of control handle 50 in a forward direction causes the upper cam to pivot in a counter-clockwise direction about shaft 130 causing roller 146 to follow slope 150, and reverse rotation of the control handle causes clockwise rotation of the upper cam and relative movement of roller 146 along slope 152. While cam follower 146 is on either surface 150 or 152 the force exerted by spring 140 induces a rotational force on cam 104 which tends to pull control handle 50 ahead of the position in which the driver intends to hold it. Conversely, when the driver attempts to return the control handle to a neutral position this force would necessitate the application of a force by the operator which would be tiring. In order to offset such undesirable force reactions on the upper cam, cam follower 142 is caused to simultaneously move upward or downward, as the case may be, on the equal and opposing slope 144 of lower cam 124; thus, the forces balance so that the operator can control forward and reverse travel of the truck with no more effort on his part other than to overcome the friction in the joints of the linkage mechanism. When it is considered that the control handle will normally be rotated many hundreds of times per day, the importance of minimizing the energy output required of the operator will be better appreciated.

When rotation of the control handle has actuated the upper cam to a position in which follower 146 has permitted arm 134 to fully depress valve plunger 154, the rotational force created by roller 146 ceases. At this time, in order to further rotate the control, the operator must exert a slightly increased effort, because follower 142 is still in abutment with slope 144. This arrangement affords the effect of a detent, and it is at this time that the truck control achieves a coast position. This is a desirable characteristic of the master controller because it affords the driver a positive "feel" in the coast position, thus making it easy for him to locate, thereby encouraging coasting operation which economizes on consumption of battery energy.

Further motion of the master controller away from neutral permits speed cam follower 142 to move successively into speed detents 200, 202 and 204, which represent speed positions 2, 4 and 6, or quarter speed, half-speed, and full speed, respectively which are the operational speeds of the vehicle. Motion of the cams beyond coast position involves continued light pressure of cam follower 142 against lower cam 124, but no contact at all between follower 146 and the upper cam 104 inasmuch as the upper cam follower is restrained from further movement toward its cam by valve plunger 154 which is located at its inward travel limit position. Of course, any suitable mechanical limit stop can serve the same purpose. During motion of the speed controller cam from a neutral position to a full speed position, five master control switches, identified as S, are actuated successively.

A double throw directional switch DS is adapted to be actuated by a cam 205 which is secured to crank 110. As illustrated, switch DS is located in a neutral position, as are all other elements of the control system in the various figures, and its cam follower 207 is located on a sloped portion of cam 205 which connects a raised portion 209 thereof with a depressed portion 211. Clockwise rotation of crank 110 for forward travel causes follower 207 to move towards the switch, and counter-clockwise rotation of crank 110 for controlling travel in reverse actuates switch DS to its opposite contact. Switch DS is moved to its forward or reverse contact upon initial rotational movement of control handle 50. One of the switches S is closed in all speed positions of the controller such that switch DS closes the circuit to either the forward or reverse motor switches for controlling the direction of travel of the truck.

Control handle 50 is preferably marked for coasting operation and for speeds 1, 2, 4 and 6, for both forward and reverse, in order to facilitate operator speed selection.

Summary

From the foregoing detailed description of the construction and operation of my invention it will now be understood that I have provided a vastly improved and extremely novel control system which is especially well adapted for use with industrial trucks of the narrow-aisle type. This invention is a significant aid in overcoming problems involved heretofore in control systems for such industrial trucks, which were of such a serious nature that despite affording the advantage of large dollar savings over other types of material handling equipment, the narrow-aisle truck has not enjoyed the high percentage of the market to which it is properly entitled.

The present invention solves problems of construction and operation which have heretofore greatly limited the application of such trucks. The provision of the single control handle 50, which is capable of fully controlling all major aspects of truck operation, excepting steering of the traction wheels and actuation of the mast in extension and retraction, constitutes an advance in the art, the significance of which cannot be overemphasized. It combines in a single control medium not only control of the lifting and lowering of the fork, control of a plurality of operating and transitional speeds, both in forward and reverse, and a supporting member for steadying the operator, but it also permits automatic control and modulation of braking action through the medium of the master controller and the hydraulic portion of the braking system.

The braking system is controlled automatically upon actuation of the main control handle and as a function of master controller position. In this respect, braking pressure is modulated to provide a smoother braking action than heretofore.

The industrial truck and complete control system therefor is described in detail in its entirety in my above-mentioned copending original application Serial No. 818,869.

It will be apparent to those skilled in the art that various changes and modifications in the structure and relative arrangement of parts may be made to suit requirements without departing from the scope of my invention.

I claim:

1. In a control system for a vehicle having an operator's station, an operator vehicle control means located at the station comprising supporting means, pivot means mounted on said supporting means, a member connected to said pivot means for upward and downward pivotal movement relative to the supporting means, a handle member pivotally supported upon the connecting member and extending outwardly therefrom, said handle member being supported for rotational movement in both directions about its own axis by the connecting member and being also adapted to cause the connecting member to be pivoted upwardly and downwardly relative to the supporting member for effecting a plurality of vehicle controls, said supporting means cooperating with said connecting member and with said handle member such that the handle member is prohibited from moving in a plane transverse to the plane of movement of the connecting member to afford positive support for the operator in a direction longitudinal of the vehicle.

2. In a control system for a vehicle, an operator's station, and an operator vehicle control means located at the station comprising a pair of supporting members spaced longitudinally of the vehicle, a pair of axially spaced pivot means mounted on respective ones of said supporting members, yoke means connecting said pivot means, said yoke means being pivotable upwardly and downwardly in a plane transverse to the plane of the supporting members, a handle member extending outwardly of said yoke means and supported thereby for axial rotational movement in either direction from a neutral position thereof, said handle member being also adapted to impart upward and downward pivotal movement to said yoke means, said supporting members cooperating with the yoke means and with the handle member such that the handle member is prohibited from moving toward either supporting member whereby to afford positive support or stabilizing means for the operator during operation of the vehicle, and a plurality of vehicle control means operatively connected to the handle member, whereby each of the aforesaid available movements of the handle member effects operation of one of said plurality of control means.

3. In a control system for a vehicle, an operator's station, an operator vehicle control means located at the station comprising a pair of upstanding supporting members, pivot means mounted in and transversely of each supporting member, yoke means connecting the pivot means, a handle member extending outwardly of the yoke means in a plane intermediate the planes of the supporting members and supported by the yoke means for rotational movement forwardly and rearwardly of a neutral position thereof, said handle member being adapted also to actuate the yoke means rotationally in opposite directions from a neutral position thereof about the axes of said pivot means, first vehicle control means operatively connected to the handle member for effecting a first vehicular control upon upward movement of the handle member and yoke means and a second vehicular control upon downward movement thereof, and second vehicle control means operatively connected to the handle member for effecting a third vehicular control upon axial rotational movement of the handle member in one direction and a fourth vehicular control upon axial rotational movement of the handle member in the opposite direction, said supporting members cooperating with said handle member and with said yoke means such that the handle member is prohibited from moving forwardly or rearwardly of the vehicle whereby to afford positive support or stabilizing means for the operator during operation of the vehicle.

4. In a control system for an industrial truck of a narrow-aisle type having a body portion located rearwardly thereof, an operator's station formed in said body portion for permitting an operator to stand at the rear of the truck while operating same, outrigger legs extending forwardly of the rear body portion and elevatable load lifting means associated with the outrigger legs for movement longitudinally thereof, an operator truck control means located at said station comprising a pair of spaced supporting members, pivot means mounted on each supporting member, a member connecting said pivot means for upward and downward pivotal movement, a hand operated member supported upon the connecting member and extending therefrom for pivotal movement in either direction about its own axis, said hand operated member being adapted to cause the connecting member to be pivoted upwardly and downwardly relative to the supporting members, first control means connected to the connecting member and adapted upon upward movement thereof to effect upward movement of the load engaging means, and upon downward movement thereof to effect downward movement of the load engaging means, and second control means operatively connected to the hand operated member and operable upon forward axial rotation of the hand operated member to effect forward movement of the truck and upon rearward rotational movement of said member to effect rearward movement of the truck.

5. A control system as claimed in claim 4, wherein said spaced supporting members cooperate with said connecting member and with said hand operated member such that the latter member is prohibited from movement in a forward or rearward direction relative to the truck, whereby to afford positive support or stabilizing means for the operator during operation of the truck.

6. In an industrial truck having an operator's station of the stand-up type formed in a body portion of the truck, an operator truck control means located at said station comprising supporting means, pivot means mounted on said supporting means, a member connected to said pivot means for effecting vehicular controls for upward and downward pivotal movement thereof, a hand operated member supported upon the connected member and extending therefrom for pivotal movement in either direction about its own axis for effecting other vehicular controls, said hand operated member being adapted to cause the connected member to be pivoted upwardly and downwardly relative to the supporting means, said supporting means cooperating with said connected member and with said hand operated member such that the latter member is prohibited from movement in a forward or reverse direction relative to the truck thus affording positive support means for the operator.

7. In an industrial truck of a stand-up type having a body portion, an operator's station adjacent the body portion and elevatable load supporting means extending forwardly of the body portion, operator control means comprising support means on the body portion adjacent to the operator's station, a means connected to said support means for upward and downward pivotal movement, control means operatively connected to the connected means and to the load supporting means for controlling upward movement of the load supporting means upon upward pivotal movement of the connected means and for controlling downward movement of the load supporting means upon downward pivotal movement of the connected means, means associated with said support means and said connected means interfering with downward pivotal movement of said connected means, and means for actuating the interfering means out of interfering relation whereby to permit downward pivotal movement of the connected means.

8. Operator control means as claimed in claim 7, wherein said support means comprises a pair of spaced supporting members and said connected means includes yoke means pivotable relative to the supporting members and a handle means extending outwardly therefrom and mounted upon the yoke means for axial rotation, second truck control means, and means operatively connecting said handle means to the said second control means, said operative connection including an element extending from the handle means and being rotatable therewith and being located on the axis of the pivot means for said connected means, whereby the first and second truck control means are each operable independently of the other or simultaneously with each other.

9. Operator control means as claimed in claim 8, wherein the supporting members interfere with movement of the connected means in a forward or rearward direction relative to the axis of the truck, whereby to provide operator stabilizing means.

10. Operator control means as claimed in claim 7, wherein said connected means includes a hand operated member extending outwardly therefrom for pivoting the connected means, and an actuator extending axially of the handle member for actuating said interfering means out of interfering relation.

References Cited in the file of this patent

UNITED STATES PATENTS

| | | |
|---|---|---|
| 2,320,601 | Howell | June 1, 1943 |
| 2,395,345 | Schreck | Feb. 19, 1946 |
| 2,507,357 | Stoner | May 9, 1950 |
| 2,513,718 | Gfrorer | July 4, 1950 |
| 2,789,648 | Huffman | Apr. 23, 1957 |
| 3,014,344 | Arnot | Dec. 26, 1961 |
| 3,022,850 | Bidwell et al. | Feb. 27, 1962 |
| 3,027,961 | Rogant | Apr. 3, 1962 |